United States Patent
Hu et al.

(10) Patent No.: US 11,740,417 B2
(45) Date of Patent: Aug. 29, 2023

(54) SILICON PHOTONICS MULTI-CHANNEL PARALLEL OPTICAL COMPONENT AND COUPLING METHOD THEREOF

(71) Applicant: LINKTEL TECHNOLOGIES CO., LTD., Wuhan (CN)

(72) Inventors: Baiquan Hu, Wuhan (CN); Xuefeng Lin, Wuhan (CN); Linke Li, Wuhan (CN); Tianshu Wu, Wuhan (CN); Xianwen Yang, Wuhan (CN); Jian Zhang, Wuhan (CN)

(73) Assignee: LINKTEL TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 17/927,755

(22) PCT Filed: Jun. 17, 2021

(86) PCT No.: PCT/CN2021/100470
§ 371 (c)(1),
(2) Date: Nov. 25, 2022

(87) PCT Pub. No.: WO2022/217736
PCT Pub. Date: Oct. 20, 2022

(65) Prior Publication Data
US 2023/0194808 A1    Jun. 22, 2023

(30) Foreign Application Priority Data
Apr. 16, 2021    (CN) .......................... 202110412405.6

(51) Int. Cl.
*G02B 6/42* (2006.01)

(52) U.S. Cl.
CPC ............. *G02B 6/4246* (2013.01); *G02B 6/42* (2013.01); *G02B 6/4207* (2013.01); *G02B 6/428* (2013.01); *G02B 6/4269* (2013.01)

(58) Field of Classification Search
CPC ...... G02B 6/1225; G02B 6/4246; G02B 6/42; G02B 6/4207; G02B 6/4269; G02B 6/428; G02F 1/212
See application file for complete search history.

(56) References Cited

U.S. PATENT DOCUMENTS 11,256,154 B2 *   2/2022   Abe .......................... G02F 1/212
2020/0200971 A1 *  6/2020   Wohlfeil .............. G02B 6/1225

FOREIGN PATENT DOCUMENTS

CN      105334580 A    2/2016
CN      106405755 A    2/2017
(Continued)

*Primary Examiner* — Michael P Mooney
(74) *Attorney, Agent, or Firm* — Bayramoglu Law Offices LLC

(57) ABSTRACT

A silicon photonics integrated chip includes the transmit-input waveguide unit, the splitter unit, the modulator unit, the transmit-output waveguide unit, the receive-input waveguide unit and the receiving detector unit integrated inside the chip. A silicon photonics multi-channel parallel optical component and a coupling method of the silicon photonics multi-channel parallel optical component are also provided. The integrated silicon photonics chip is adopted, the transmitting part still uses two-way DC laser group, the receiving chip is integrated inside the silicon photonics chip, and the optical interface adopts the mature FA-MPO in the industry. It has the advantages of mature technology, high degree of integration, relatively low cost, fewer coupling processes, etc., it is one of the advantageous choices for rates above 400 G.

10 Claims, 3 Drawing Sheets

(56) References Cited

FOREIGN PATENT DOCUMENTS

| CN | 107111056 A | 8/2017 |
|---|---|---|
| CN | 108474911 A | 8/2018 |
| CN | 209327619 U | 8/2019 |
| CN | 110376688 A | 10/2019 |
| CN | 110609399 A | 12/2019 |
| CN | 209784601 U | 12/2019 |
| CN | 110764202 A | 2/2020 |
| CN | 110809726 A | 2/2020 |
| CN | 111338039 A | 6/2020 |
| CN | 111665601 A | 9/2020 |
| CN | 108474911 B | 12/2020 |
| CN | 112114446 A | 12/2020 |
| JP | 2020177192 A | 10/2020 |

* cited by examiner

SILICON PHOTONICS MULTI-CHANNEL PARALLEL OPTICAL COMPONENT AND COUPLING METHOD THEREOF

CROSS REFERENCE TO THE RELATED APPLICATIONS

This application is the national phase entry of International Application No. PCT/GN2021/100470, filed on Jun. 17, 2021, which is based upon and claims priority to Chinese Patent Application No. 202110412405.6, filed on Apr. 16, 2021, the entire contents of which are incorporated herein by reference.

TECHNICAL FIELD

The present invention relates to the optical communication field, specifically, to a silicon photonics integrated chip, a silicon photonics multi-channel parallel optical component and a coupling method thereof.

BACKGROUND

For multi-channel parallel optical components, they are mostly used in scenarios with rates above 40 Gpbs, such as 40 G, 100 G, 200 G and 400 G, 800 G and other applications. In data center applications, they are usually medium and short distance data transmission, and the transmission distance is 50-2 Km, using SR, DR, FR and other products. For high-speed optical modules such as 400 G and 800 G, the dispersion of optical fiber is the main factor restricting the transmission distance of the optical modules. The method of obtaining narrow spectral width and external modulation of EML lasers is a technical solution to obtain stable modulation and low dispersion, which is also the mainstream choice in the current market, such as the patent CN110764202A. However, EML laser chips applied to 400 G and 800 G rates are the core chips with technical bottlenecks at the high-end, which are expensive. The parallel optical component means that multi-channel EML chips are used, so the material cost of optical components is very high. How to reduce the cost of parallel optical component has always been the direction of effort for the industry.

SUMMARY

One purpose of the present invention is to provide a silicon photonics integrated chip, a silicon photonics multi-channel parallel optical component and a coupling method thereof. Packaging of parallel optical components through silicon photonics integrated chips can greatly reduce costs.

To achieve the above purpose, the embodiment of the present invention provides the following technical solution: a silicon photonics integrated chip, includes laser group 204, FA assembly 210 and silicon photonics integrated chip 203, both the transmit-output waveguide unit and the receive-input waveguide are connected to the FA assembly 210, and the transmit-input waveguide unit is arranged in the same path as the laser group 204, along the direction from the laser group 204 to the silicon photonics integrated chip 203, a coupling lens group 205, an isolator 206, a prism group 207 and transmitting end glass strip 208 are arranged in sequence between the laser group 204 and the silicon photonics integrated chip 203.

Further, along the direction from the FA assembly 210 to the silicon photonics integrated chip 203, a receiving end glass strip 209 is further provided between the FA assembly 210 and the silicon photonics integrated chip 203.

Further, it also includes a PCBA board 201, the PCBA board 201 is provided with a window 215 penetrating the upper and lower surfaces of the PCBA board 201, the silicon photonics integrated chip 203, the laser group 204, the coupling lens group 205, the isolator 206, the prism group 207, the transmitting end glass strip 208, the receiving end glass strip 209 and the FA assembly 210 are all placed in the window 215.

Further, the window 215 is provided with a thermal sink 401, and the silicon photonics integrated chip 203, the laser group 204, the coupling lens group 205, the isolator 206, the prism group 207, the transmitting end glass strip 208, the receiving end glass strip 209 and the FA assembly 210 are all arranged on the thermal sink 401.

Further, the thermal sink 401 is in a step shape, the silicon photonics integrated chip 203 is arranged on the higher platform of the step shape, and the laser group 204, the coupling lens group 205, the isolator 206 are arranged on the lower platform.

Further, the lower surface of the PCBA board 201 is provided with a support plate 402 for plugging the window 215, and the thermal sink 401 is placed on the support plate 402.

Further, it also includes a transmitting end driver chip 212 and a receiving end TEA chip 213, both the transmitting end driver chip 212 and the receiving end TIA chip 213 are located on the side of the silicon photonics integrated chip 203 away from the laser group 204 and the FA assembly 210, the transmitting end driver chip 212 is located in the direction from the laser group 204 to the silicon photonics integrated chip 203, and the receiving end TIA chip 213 is located in the direction from the FA assembly 210 to the silicon photonics integrated chip 203.

Further, the laser group 204 includes a first laser 204-1 and a second laser 204-2, the first laser 204-1 and the second laser 204-2 both include a laser chip 501 and a ceramic thermal sink 502, the laser chip 501 is eutectic welded on the ceramic thermal sink 502, and the upper surface of the ceramic thermal sink 502 has the positive electrode and the negative electrode of the laser chip 501.

Further, the grinding angle of the end face of the FA assembly 210 is equal to the inclination angle $\theta$ of the receive-input waveguide unit in the silicon photonics integrated chip 203, and the main body of the FA assembly 210 is inclined towards the central axis of the entire optical component, the side of the FA assembly 210 away from the silicon photonics integrated chip 203 is connected with an MPO/MT optical interface 202 through an optical fiber cable 211.

The embodiment of the present invention also provides the following technical solution: a coupling method of the silicon photonics multi-channel parallel optical component, including:

S1, complete the assembly of the silicon photonics integrated chip 203, the laser group 204, the coupling lens group 205, the isolator 206 and the prism group 207 on PCBA board;

S2, turn on the laser group 204 to maximize the response current of the monitoring detector unit, and solidify the coupling lens group 205;

S3, turn on the response current monitoring of the receiving detector unit, and connect the FA assembly 210 with external jumper 701;

S4, the jumper 701 is connected to an external optical device, the FA assembly 210 is fixed, and the coupling is completed.

Compared with the prior art, the invention has the following beneficial effects: the present invention adopts the integrated silicon photonics chip, the transmitting part still uses two-way DC laser group, the receiving chip is integrated inside the silicon photonics chip, and the optical interface adopts the mature FA-MPO in the industry., it has the advantages of mature technology, high degree of integration, relatively low cost, fewer coupling processes, etc., it is one of the advantageous choices for rates above 400 G.

DETAILED DESCRIPTION OF THE EMBODIMENTS

The technical scheme in the embodiments of the present invention will be clearly and completely described below in combinat with the accompanying drawings in the embodiments of the present invention. Obviously, the described embodiments are only a part of the present invention, not all of the embodiments. Based on the embodiments of the present invention, all other embodiments obtained by one of ordinary skill in the art without creative work shall fall within the protection scope of the present invention.

Example 1

Figure 1:
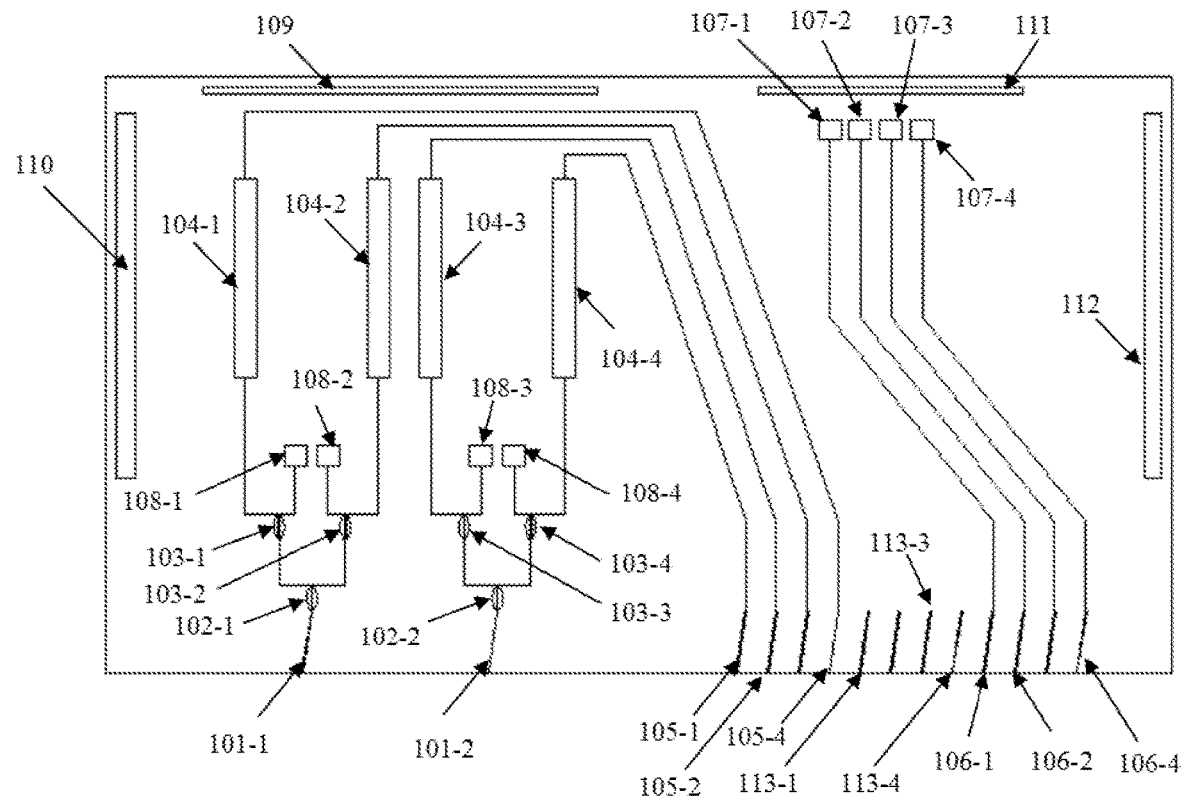
FIG. 1 shows the schematic diagram of a silicon photonics integrated chip according to the embodiment of the present invention.
Figure 2:
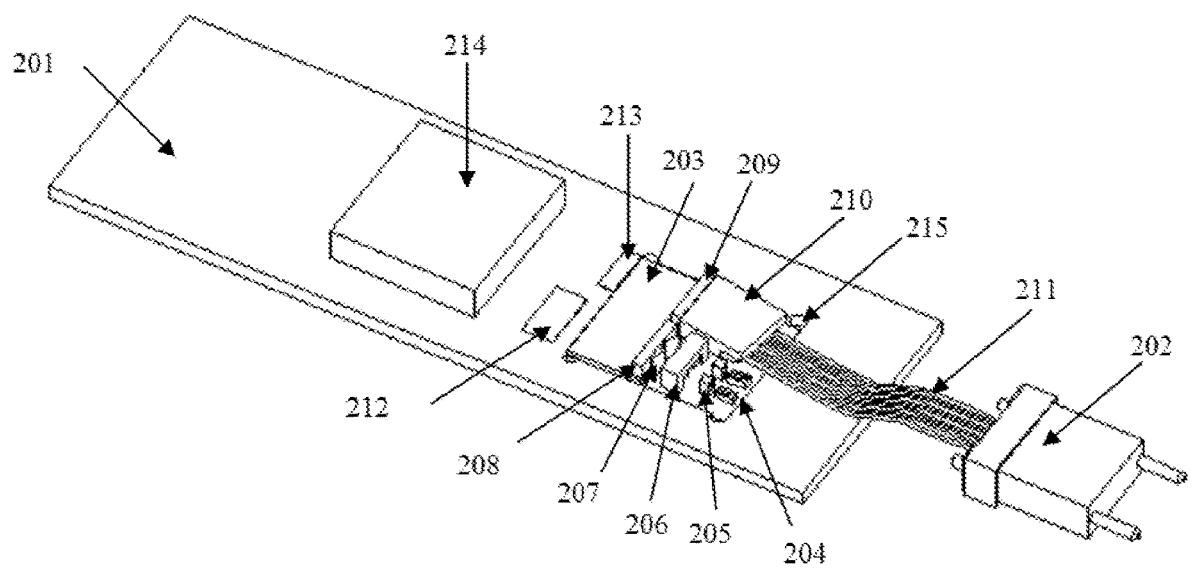
FIG. 2 shows the schematic diagram of a silicon photonics multi-channel parallel optical component of the silicon photonics integrated chip according to the embodiment of the present invention.
Figure 3:
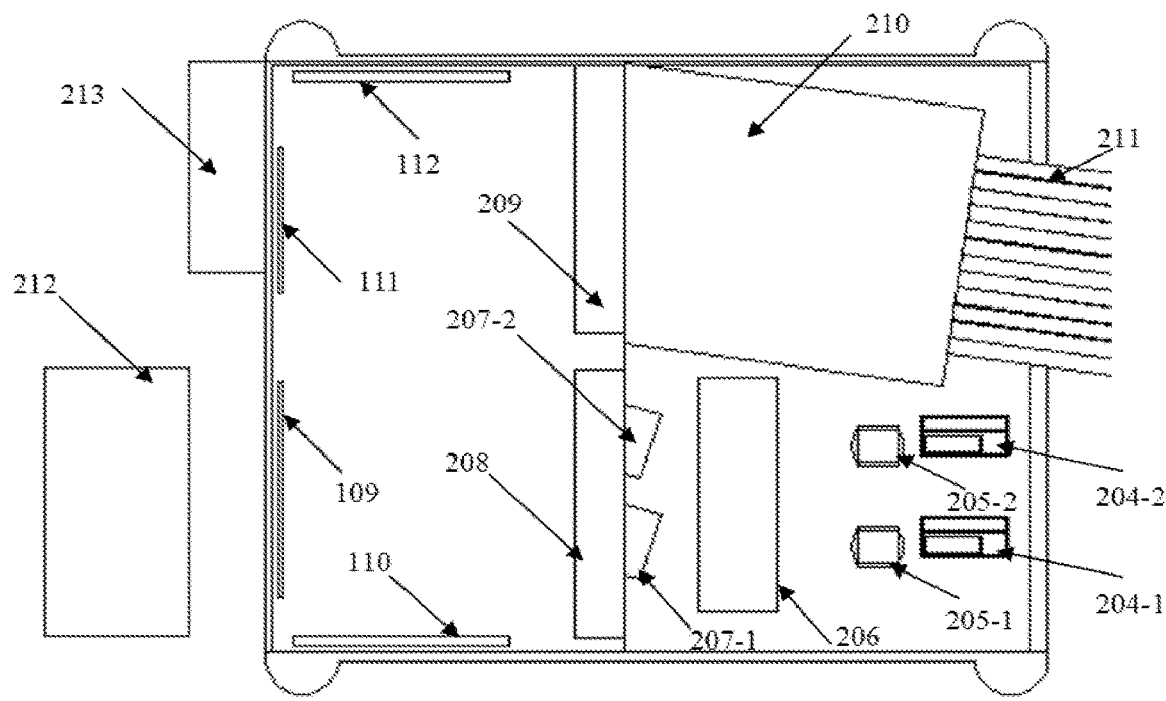
FIG. 3 shows the vertical view of a silicon photonics multi-channel parallel optical component of the silicon photonics integrated chip according to the embodiment of the present invention.
Figure 4:
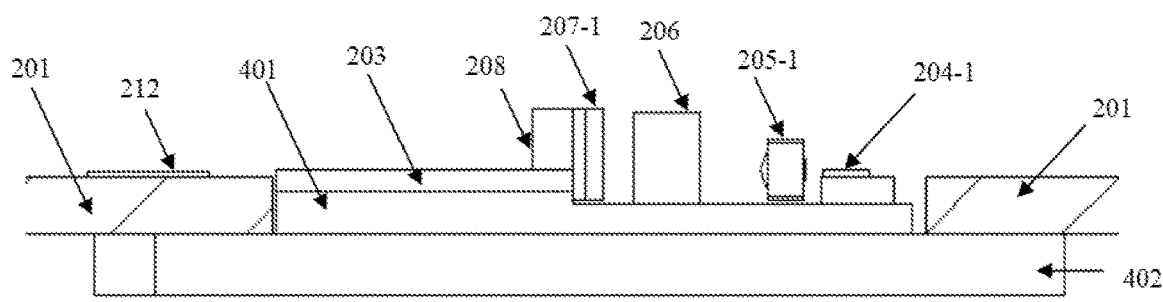
FIG. 4 shows the section view from side view of a silicon photonics multi-channel parallel optical component of the silicon photonics integrated chip according to the embodiment of the present invention.
Figure 5:
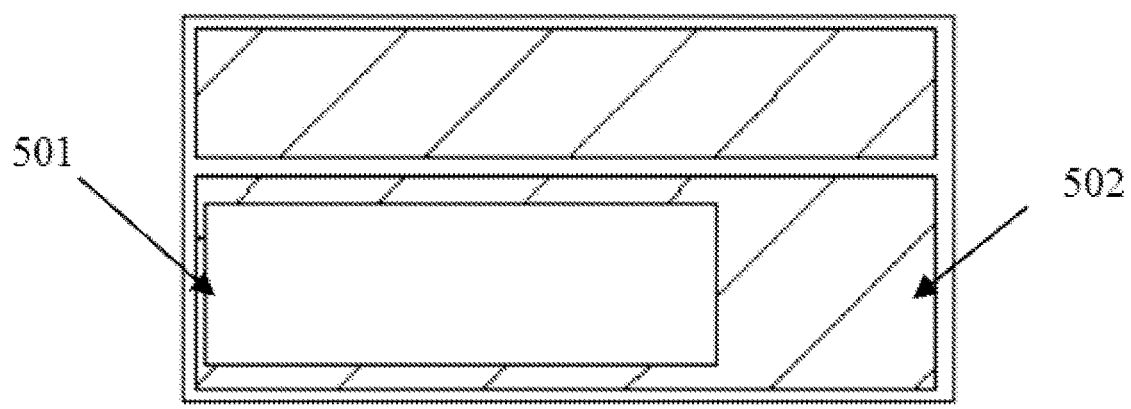
FIG. 5 shows the schematic diagram of the laser group of a silicon photonics multi-channel parallel optical component of the silicon photonics integrated chip according to the embodiment of the present invention.
Figure 6:
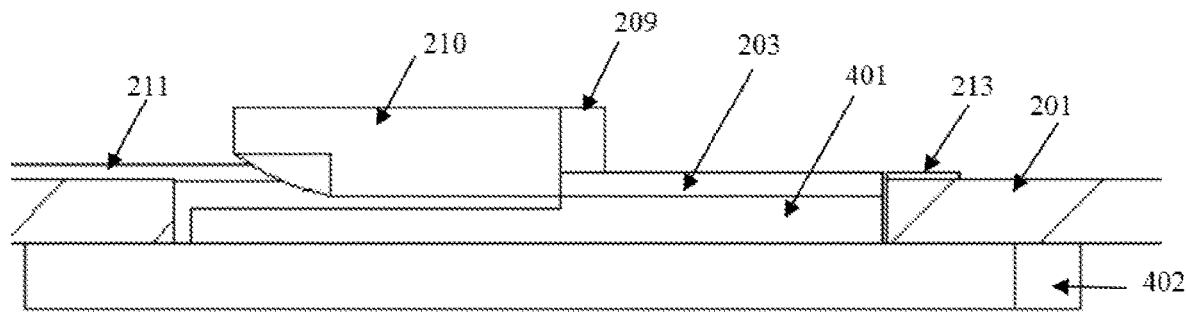
FIG. 6 shows the side view of receiving unit of a silicon photonics multi-channel parallel optical component of the silicon photonics integrated chip according to the embodiment of the present invention.
Figure 7:
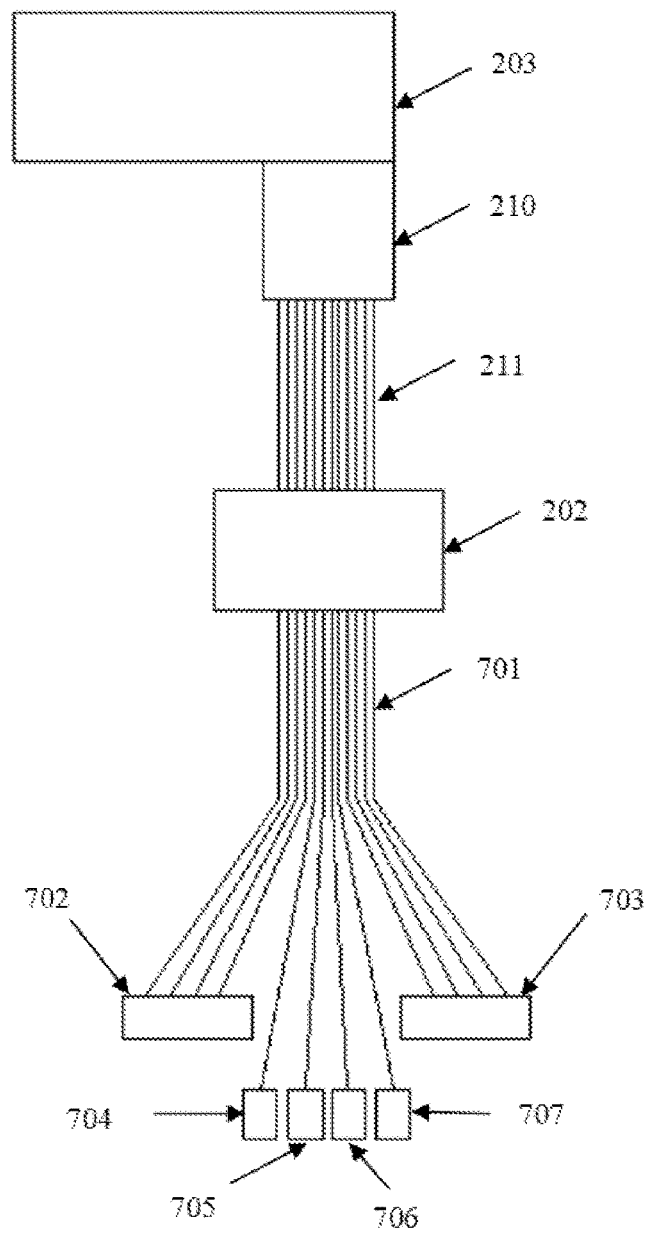
FIG. 7 shows the schematic diagram of coupling and fiber connection of a silicon photonics multi-channel parallel optical component of the silicon photonics integrated chip according to the embodiment of the present invention.

Refer to FIG. 1, the embodiment of the present invention provides a silicon photonics integrated chip, which includes a transmit-input waveguide unit, a splitter unit, a modulator unit, a transmit-output waveguide unit, a receive-input waveguide unit, and a receiving detector unit integrated inside the chip; the transmit-input waveguide unit is used for receiving the optical signal input from the outside at the transmitting part; the splitter unit is used for splitting light; the modulator unit is used for modulating the optical signal; the transmit-output waveguide unit is used for outputting the optical signal modulated by the modulator unit to the outside world; the receive-input waveguide unit is used for receiving the optical signal input by the external link at the receiving part; the receiving detector unit is used for converting the optical signal into photocurrent. In this embodiment, the transmit-input waveguide unit, the splitter unit, the modulator unit, the transmit-output waveguide unit, the receive-input waveguide unit, and the receiving detector unit are integrated in the chip, where both the transmit area and the receive area are integrated in the chip, which not only reduces the cost but also reduces the subsequent coupling process.

As an optimization scheme of the embodiment of the present invention, please refer to FIG. 1, the transmit-input waveguide unit includes a first transmit-input waveguide 101-1 and a second transmit-input waveguide 101-2, the splitter unit includes a first 3 db splitter 102-1, a second 3 db splitter 102-2, a first proportional splitter 103-1, a second proportional splitter 103-2, a third proportional splitter 103-3 and a fourth proportional splitter 103-4, the modulator unit includes a first MZ waveguide type modulator 104-1, a second MZ waveguide type modulator 104-2, a third MZ waveguide type modulator 104-3, and a fourth MZ waveguide type modulator 104-4, the transmit-output waveguide unit includes a first transmit-output waveguide 105-4, a second transmit-output waveguide 105-3, a third transmit-output waveguide 105-2 and a fourth transmit-output waveguide 105-1, the receive-input waveguide unit includes a a first receive-input waveguide 106-1, a second receive-input waveguide 106-2, a third receive-input waveguide 106-3 and a fourth receive-input waveguide 106-4, the receiving detector unit includes a first receiving detector 107-1, a second receiving detector 107-2, a third receiving detector 107-3 and a fourth receiving detector 107-4, the first transmit-input waveguide 101-1, the first 3 db splitter 102-1, the first proportional splitter 103-1, the first MZ waveguide type modulator 104-1, and the the first transmit-output waveguides 105-4 are connected in sequence, the first receive-input waveguide 106-1 is connected with the first receiving detector 107-1, the first transmit-input waveguide 101-1, the first 3 db splitter 102-1, the second proportional splitter 103-2, the second MZ waveguide type modulator 104-2, the second transmit-output waveguides 105-3 are connected in sequence, the second receive-input waveguide 106-2 is connected with the second receiving detector 107-2, the second transmit-input waveguide 101-2, the second 3 db splitter 102-2, the third proportional splitter 103-3, the third MZ waveguide type modulator 104-3, the third transmit-output waveguides 105-2 are connected in sequence, the third receive-input waveguide 106-3 is connected with the third receiving detector 107-3, the second transmit-input waveguide 101-2, the second 3 db splitter 102-2, the fourth proportional splitter 103-4, the fourth MZ waveguide type modulator 104-4, the fourth transmit-output waveguides 105-1 are connected in sequence, the fourth receive-input waveguide 106-4 is connected with the fourth receiving detector 107-4. Preferably, the integrated chip further includes a monitoring detector unit, the monitoring detector unit includes a first monitoring detector 108-1, a second monitoring detector 108-2, a third monitoring detector 108-3 and a fourth monitoring detector 108-4, the loop where the first transmit-input waveguide 101-1, the first 3 db splitter 102-1, the first proportional splitter 103-1, the first MZ waveguide type modulator 104-1 and the first transmit-output waveguide 105-4 are located is connected with the first monitoring detector 108-1, the loop where the first transmit-input waveguide 101-1, the first 3 db splitter 102-1, the second proportional splitter 103-2, the second MZ waveguide type modulator 104-2 and the second transmit-output waveguide 105-3 are located is connected with the second monitoring detector 108-2, the loop where the second transmit-input waveguide 101-2, the second 3 db splitter 102-2, the thrid proportional splitter 103-3, the thrid MZ waveguide type modulator 104-3 and the thrid transmit-output waveguide 105-2 are located is connected with the thrid monitoring detector 108-3, the loop where the second transmit-input waveguide 101-2, the second 3 db splitter 102-2, the fourth proportional splitter 103-4, the fourth MZ waveguide type modulator 104-4 and the fourth transmit-output waveguide 105-1 are located is connected with the fourth monitoring detector 108-4. in this embodiment, for the transmission area, above the first transmit-input waveguide 101-1 and the second transmit-input waveguide 101-2 are the first 3 dB splitter 102-1 and the second 3 dB splitter 102-2 in sequence, where the first transmit-input waveguide 101-1 corresponds to the first 3 dB splitter 102-1, the second transmit-input waveguide 101-2 corresponds to the second 3 dB splitter 102-2; the first proportional splitter 103-1 and the second proportional splitter 103-2 are arranged above the first 3 dB splitter 102-1, where the first proportional splitter 103-1 is located on the left side, and the third proportional splitter 103-3 and the fourth proportional splitter 103-4 are arranged above the second 3 dB splitter 102-2, where the proportional splitter 103-3 is located on the left, to the right of the second proportional splitter 103-2 is the third proportional splitter 103-3, where the first proportional splitter 103-1 and the third proportional splitter 103-3 are both 97:3 splitters, both the second proportional splitter 103-2 and the fourth proportional splitters 103-4 are 3:97 splitters; the first proportional splitter 103-1 outputs two waveguides, the splitting ratio of the left waveguide arm is 97%, and the MZ modulator 104-1 is set above it, the splitting ratio of the right waveguide arm is 3%, and the monitoring detector 108-1 is set above it, similarly, the third proportional splitter 103-3 outputs two waveguides, where the splitting ratio of the left waveguide arm is 97%, the MZ modulator 104-3 is arranged above it, and the splitting ratio of the right waveguide arm is 3%, the monitoring detector 108-3 is set above, similarly, the second proportional splitter 103-2 outputs two waveguides, where the splitting ratio of the left waveguide arm is 3%, the monitoring detector 108-2 is arranged above it, and the splitting ratio of the right waveguide arm is 97%, the MZ modulator 104-2 is set above, similarly, the fourth proportional splitter 103-4 outputs two waveguides, where the splitting ratio of the left waveguide arm is 3%, the monitoring detector 108-4 is arranged above it, and the splitting ratio of the right waveguide arm is 97%, the MZ modulator 104-4 is set above. Preferably, the adjustment range of the proportional relationship between the first proportional splitter 103-1, the second proportional splitter 103-2, the third proportional splitter 103-3 and the fourth proportional splitter 103-4 is 9:5:5~99.5:0.5 or 0.5:99.5~5:95, 3:97 proportional splitter and 97:3 proportional splitter are one preferred proportion, the splitting ratio is unlimited, and can be adjusted according to the power demand.

As an optimization scheme of the embodiment of the present invention, please refer to FIG. 1, an auxiliary waveguide unit is arranged between the transmit-output waveguide unit and the receive-input waveguide unit. The auxiliary waveguide unit includes a first auxiliary waveguide 113-1, a second auxiliary waveguide 113-2, a third auxiliary waveguide 113-3 and a fourth auxiliary waveguide 113-4. When the auxiliary waveguide unit is self-loop coupled, the first auxiliary waveguide 113-1 is connected to the second auxiliary waveguide 113-2, and the third auxiliary waveguide 113-3 is connected to the fourth auxiliary waveguide 113-4. Each waveguide in the transmit-input waveguide unit, each waveguide in the transmit-output waveguide unit, each waveguide in the receive-input waveguide unit, and each waveguide in the auxiliary waveguide unit are arranged at an inclined angle. Each waveguide in the transmit-input waveguide unit, each waveguide in the transmit-output waveguide unit, each waveguide in the receive-input waveguide unit, and each waveguide in the auxiliary waveguide unit are all located at the same boundary of the chip, and each waveguide is inclined in the same direction, the inclined angle $\theta$ is controlled between 6 and 12 degrees. In each waveguide in the transmit-output waveguide unit, each waveguide in the receive-input waveguide unit, and each waveguide in the auxiliary waveguide unit, the distance between two adjacent waveguides is $0.25/\cos(\theta)$ mm. In this embodiment, two transmit-input waveguides are set at the bottom of the chip, namely the first transmit-input waveguide 101-1 and the second transmit-input waveguide 101-2, and four transmit-output waveguides, namely the fourth transmit-output waveguide 105-1, the third transmit-output waveguide 105-2, the second transmit-output waveguide 105-3, the first transmit-output waveguide 105-4, four receive-input waveguides, namely the first receive-input waveguide 106-1, the second receive-input waveguide 106-2, the third receive-input waveguide 106-3, the fourth receive-input waveguide 106-4, four auxiliary waveguides, namely the first auxiliary waveguide 113-1, the second auxiliary waveguide 113-2, the third auxiliary waveguide 113-3, the fourth auxiliary waveguide 113-4, there are a total of fourteen waveguides, all fourteen waveguides are inclined to the left at an angle of $\theta$, which is preferably 6-12 degrees, and all fourteen waveguides are located at the boundary end of the silicon photonics chip. The first transmit-input waveguide 101-1 and the second transmit-input waveguide 101-2 are both located on the left side, and the distance between the first transmit-input waveguide 101-1 and the second transmit-input waveguide 101-2 is preferably 0.8-2 mm; on the right side of the second transmit-input waveguide 101-2 are the fourth transmit-output waveguide 105-1, the third transmit-output waveguide 105-2, the second transmit-output waveguide 105-3, and the first transmit-output waveguide 105-4, the distance between the second transmit-input waveguide 101-2 and the fourth transmit-output waveguide 105-1 is preferably 1-2 mm; on the right side of the first transmit-output waveguide 105-4 are the first auxiliary waveguide 113-1, the second auxiliary waveguide 113-2, the third auxiliary waveguide 113-3, the fourth auxiliary waveguide 113-4, and the fourth auxiliary waveguide 113-4, on the right side of the fourth auxiliary waveguide 113-4 are the first receive-input waveguide 106-1, the second receive-input waveguide 106-2, the third receive-input waveguide 106-3, the fourth receive-input waveguide 106-4, and the distance between the twelve waveguides, namely the fourth transmit-output waveguide 105-1, the third transmit-output waveguide 105-2, the second transmit-output waveguide 105-3, the first transmit-output waveguide 105-4, the first receive-input waveguide 106-1, the second receive-input waveguide 106-2, third receive-input waveguide 106-3, the fourth receive-input waveguide 106-4, the first auxiliary waveguide 113-1, the second auxiliary waveguide 113-2, the third auxiliary waveguide 113-3, and the fourth auxiliary waveguide 113-4, is all standard $0.25/\cos(\theta)$ mm.

As an optimization scheme of the embodiment of the present invention, please refer to FIG. 1, the integrated chip also includes a high-speed signal transmitting pad area 109, a DC control signals transmitting pad area 110, a high-speed signal receiving pad area 111, and a control signal receiving pad area 112, which are integrated on the surface of the chip, The chip is rectangular, the high-speed signal transmitting pad area 109 and the high-speed signal receiving pad area 111 are both located at the boundary of the chip relative to the boundary where the transmit-input waveguide unit is located, the DC control signals transmitting pad area 110 and the control signal receiving pad area 112 are respectively located at the other two boundaries. At this embodiment, the four MZ modulators are, from left to right, the first MZ modulator 104-1, the second MZ modulator 104-2, the third MZ modulator 104-3, the fourth MZ modulator 104-4, the four MZ modulators are sequentially connect to the first transmit-output waveguide 105-4, the second transmit-output waveguide 105-3, the third transmit-output waveguide 105-2, and the fourth transmit-output waveguide 105-1 in a one-to-one correspondence through waveguides. On the left side of the four MZ modulator areas is the DC control signals transmitting pad area 110, and above it is the high-speed signal transmitting pad area 109. For the receiving area, the first receiving detector 107-1 is provided above the first receive-input waveguide 106-1, the second receiving detector 107-2 is provided above the second receive-input waveguide 106-2, the third receiving detector 107-3 is provided above the third receive-input waveguide 106-3, the fourth receiving detector 107-4 is provided above the fourth receive-input waveguide 106-4, the first receive-input waveguide 106-1, the second receive-input waveguide 106-2, the third receive-input waveguide 106-3 and the fourth receive-input waveguide 106-4 are sequentially connected to the first receiving detector 107-1, the second receiving detector 107-2, the third receiving detector 107-3, and the fourth receiving detector 107 through the waveguide. The first receiving detector 107-1, the second receiving detector 107-2, the third receiving detector 107-3, and the fourth receiving detector 107-4 are located on the right side of the emission area and on the upper right of the entire chip. Above the first receiving detector 107-1, the second receiving detector 107-2, the third receiving detector 107-3, and the fourth receiving detector 107-4, the high-speed signal receiving pad area 111 is provided, and on the right side, the control signal receiving pad area area 112 is provided, The high-speed signal receiving pad area 109 and the high-speed signal receiving pad area 111 are located on one side of the long boundary of the silicon photonics chip, and are parallel to the long boundary, and the DC control signals transmitting pad area 110 and the control signal receiving pad area area 112 are located on one side of the short boundary of the silicon photonics chip, and parallel to the short boundary. The first auxiliary waveguide 113-1, the second auxiliary waveguide 113-2, the third auxiliary waveguide 113-3, and the fourth auxiliary waveguide 113-4 can be used for self-loop coupling, and can also be suspended and not used, during self-loop coupling, the first auxiliary waveguide 113-1 and the second auxiliary waveguide 113-2 are connected through the waveguide, and the third auxiliary waveguide 113-3 and the fourth auxiliary waveguide 113-4 are connected through yhe waveguide. The first transmit-input waveguide 101-1 and the second transmit-input waveguide 101-2 are specially designed stable mode waveguides with a length greater than 1 mm and an insertion loss of about 1 dB, so that any light beam input from the outside has a stable single-mode field after passing through the first transmit-input waveguide 101-1 and the second transmit input waveguide 101-2, and any light beam includes obliquely incident light beams, light beams exceeding or smaller than the theoretical single-mode aperture of the waveguide, non-uniform light beams, and multi-transverse mode fields beams, beams with multiple peaks in intensity, etc. Since the first transmit-input waveguide 101-1 and the second transmit-input waveguide 101-2 are stable mode waveguides, the light wave input to the 3 dB splitter is a uniform single-mode field, and the light splitting ratio of the 3 dB splitter is very stable, thus ensuring the stability of the input mode fields of the two 97:3 proportional splitters, the two 3:97 proportional splitters, the four MZ modulators and the four monitoring detectors.

Example 2

Please refer to FIG. 1 to FIG. 6, the embodiment of the present invention provides a silicon photonics multi-channel parallel optical component, including: laser group 204, FA assembly 210 and silicon photonics integrated chip 203, both the transmit-output waveguide unit and the receive-input waveguide are connected to the FA assembly 210, and the transmit-input waveguide unit is arranged in the same path as the laser group 204, along the direction from the laser group 204 to the silicon photonics integrated chip 203, a coupling lens group 205, an isolator 206, a prism group 207 and transmitting end glass strip 208 are arranged in sequence between the laser group 204 and the silicon photonics integrated chip 203. Along the direction from the FA assembly 210 to the silicon photonics integrated chip 203, a receiving end glass strip 209 is further provided between the FA assembly 210 and the silicon photonics integrated chip 203. it also includes a PCBA board 201, the PCBA board 201 is provided with a window 21:5 penetrating the upper and lower surfaces of the PCBA board 201, the silicon photonics integrated chip 203, the laser group 204, the coupling lens group 205, the isolator 206, the prism group 207, the transmitting end glass strip 208, the receiving end glass strip 209 and the FA assembly 210 are all placed in the window 215, The window 215 is provided with a thermal sink 401, and the silicon photonics integrated chip 203, the laser group 204, the coupling lens group 205, the isolator 206, the prism group 207, the transmitting end glass strip 208, the receiving end glass strip 209 and the FA assembly 210 are all arranged on the thermal sink 401. The thermal sink 401 is in a step shape, the silicon photonics integrated chip 203 is arranged on the higher platform of the step shape, and the laser group 204, the coupling lens group 205, the isolator 206 are arranged on the lower platform. The lower surface of the PCBA board 201 is provided with a support plate 402 for plugging the window 215, and the thermal sink 401 is placed on the support plate 402. Preferably, the isolator 206 is a dual-channel isolator, and the dual-channel isolator is bonded to the thermal sink 401. The laser group 204 and the coupling lens group 205 are both bonded to the thermal sink 401. The FA assembly 210 is suspended above the thermal sink 401. In this embodiment, a DSP chip 214 is arranged on the middle of the upper surface of the PCBA board 201, and the window 215 is is set at about ¾ of the right side of the upper surface of the PCBA board 201, the window 215 completely penetrates the PCBA board 201 and is symmetrically distributed along the central axis of the PCBA board 201. The silicon photonics integrated chip 203, the laser group 204, the coupling lens group 205, the isolator 206, the prism group 207, the transmitting end glass strip 208, the receiving end glass strip 209, the FA assembly 210 and the thermal sink 401 are all located within the area of the window 215, the support plate 402 is located below the window 215 and completely covers the window 215, and closely adheres to the PCBA board 201, and it is bonded under the PCBA board 201 through structural adhesive curing. The thermal sink 401 is arranged above the support plate 402 and inside the window 215, and the thermal sink 401 is bonded to the top of the support plate 402 by high thermal conductivity adhesive. The thermal sink 401 has a rectangular step shape, and a gap of 0.05 mm to 0.1 mm is reserved between the periphery of the thermal sink 401 and the window 215. The thermal sink 401 has two surfaces, an upper layer surface and a lower layer surface, the silicon photonics integrated chip 203 is fixed on the surface of the upper layer surface by high thermal conductivity adhesive, and the laser group 204, the coupling lens group 205, the isolator 206 and the prism group 207 are arranged on the surface of the lower layer surface. The silicon photonics integrated chip 203 completely covers the upper layer surface of the thermal sink 401, and the upper surface of the silicon photonics integrated chip 203 is substantially equal to the upper surface of the PCBA board 201 in height. The transmitting part includes two groups of transmitting elements, each group includes a laser, a coupling lens and a prism, and the isolator is shared by the two groups. The prism group 207 is directly fixed on the right side of the silicon photonics integrated chip 203 by the refractive index matching glue, The bottom of the prism group 207 is not in direct contact with the thermal sink 401 and it is suspended, the transmitting end glass strip 208 is at the upper left corner of the prism group 207 and the silicon optical integrated chip 203, the transmitting end glass strip 208 is directly bonded to the top of the silicon photonics integrated chip 203 and the left side of the prism group 207 for fixing the prism group 207. The center of the first prism 207-1 and the center of the second prism 207-2 are aligned one-to-one with the first transmit-input waveguide 101-1 and the second transmit-input waveguide 101-2. The isolator 206 is a conventional magneto-optical isolator arranged on the right side of the prism group 207, which is U-shaped in structure, and it is inverted and bonded to the lower layer surface of the thermal sink 401. On the right side of the isolator 206 is the coupling lens group 205, and the coupling lens group 205 is directly fixed on the lower layer surface of the thermal sink 401 by ultraviolet bi-cure adhesive. On the right side of the coupling lens group 205 is the laser group 204, the laser group 204 is directly fixed on the lower layer surface of the thermal sink 401 by high thermal conductivity adhesive, and the laser group 204 is located at the right end of the thermal sink 401. Because the first transmit-input waveguide 101-1 and the second transmit-input waveguide 101-2 are arranged obliquely, the prism group 207 is used to refract the optical path, so that the transmission angle of the light beam emitted by the laser chip matches the inclination angle of the first transmit-input waveguide 101-1 and the second transmit-input waveguide 101-2, so as to obtain the maximum coupling efficiency. The coupling lens group 205 may be a single lens type or a double lens type. The main body of the receiving part is integrated inside the silicon photonics integrated chip 203, and the external part is connected to the silicon photonics integrated chip 203 through the FA assembly 210. The FA assembly 210 has a total of twelve core single-mode fibers, and the spacing between each core is 0.25 mm, in particular, the grinding angle of the end face of the FA assembly 210 is equal to the inclination angle θ of the receivie-input waveguide unit in the silicon photonics integrated chip 203. The FA assembly 210 is directly bonded to the silicon photonics integrated chip 203 through the refractive index matching glue, and the twelve core optical fibers of the FA assembly 210 are aligned with the twelve waveguides of the chip one by one so as to achieve low insertion loss, the twelve waveguides include the fourth transmit-output waveguide 105-1, the third transmit-output waveguide 105-2, the second transmit-output waveguide 105-3, the first transmit-output waveguide 105-4, the first receive-input waveguide 106-1, the second receive-input waveguide 106-2, third receive-input waveguide 106-3, the fourth receive-input waveguide 106-4, the first auxiliary waveguide 113-1, the second auxiliary waveguide 113-2, the third auxiliary waveguide 113-3, and the fourth auxiliary waveguide 113-4. The receiving end glass strip 209 is arranged on the upper right corner of the FA assembly 210 and the silicon photonics integrated chip 203, and the receiving end glass strip 209 is directly bonded to the FA assembly 210 and the silicon photonics integrated chip 203 through the refractive index matching glue. The main body of the FA assembly 210 in this tilting mode is inclined towards the direction of the central axis of the entire optical assembly, so it will not exceed the window 215, and therefore will not occupy the space of the PCBA board 201, which is beneficial to the layout of the PCBA board 201. In addition, the FA assembly 210 is not in direct contact with the thermal sink 401, but is suspended above the thermal sink 401. The FA assembly 210 is integrated with the optical fiber cable 211, and the optical fiber cable 211 is suspended above the PCBA board 201.

As an optimization scheme of the embodiment of the present invention, please refer to FIG. 1 to FIG. 6, the component also includes a transmitting end driver chip 212 and a receiving end TIA chip 213, both the transmitting end driver chip 212 and the receiving end TIA chip 213 are located on the side of the silicon photonics integrated chip 203 away from the laser group 204 and the FA assembly 210, the transmitting end driver chip 212 is located in the direction from the laser group 204 to the silicon photonics integrated chip 203, and the receiving end TIA chip 213 is located in the direction from the FA assembly 210 to the silicon photonics integrated chip 203. In this embodiment, the setting direction of the silicon photonics integrated chip 203 satisfies the following requirements: the high-speed signal transmitting pad area 109 and the high-speed signal receiving pad area 111 are located on the left side, close to the left boundary of the window 215, and the control signal receiving pad area 112 is located on the top, close to the upper boundary of the window 215, and the DC control signals transmitting pad area 110 is located on the bottom, close to the lower boundary of window 215. In this way, the 12 waveguides of the silicon photonics integrated chip 203 are all located on the right side. The transmitting end driver chip 212 is located on the upper surface of the PCBA board 201, on the right side of the DSP chip 214, close to the left boundary of the window 215, and close to the high-speed signal transmitting pad area 109 of the silicon photonics chip, and the receiving end TIA chip 213 is located on the upper surface of the PCBA board 201, on the right side of the DSP chip 214, close to the left boundary of the window 215, and close to the high-speed signal receiving pad area 111 of the silicon photonics chip. The transmitting end driver chip 212 can be close to the left boundary of the window 215, or can be at a certain distance from the left boundary of the window 215. When it is close to the left boundary of the window 215, the high-speed output pad of the transmitting end driver chip 212 is directly gold wire bonded to the high-speed signal transmitting pad area 109 of the silicon photonics chip. When it is a certain distance from the left boundary of the window 215, the high-speed output pad of the transmitting end driver chip 212 is gold wire bonded with the high-frequency routing set on the PCBA board 201, and then the high-frequency routing set on the PCBA board 201 is gold wire bonded with the high-speed signal transmitting pad area 109 of the silicon photonics chip. Because the receiving end TIA chip is close to the left boundary of the window 215, the high-frequency pad of the receiving end TIA chip can be directly gold wire bonded to the high-speed signal receiving pad area 111 of the silicon photonics chip.

As an optimization scheme of the embodiment of the present invention, please refer to FIG. 1 to FIG. 6, the laser group 204 includes a first laser 204-1 and a second laser 204-2, the first laser 204-1 and the second laser 204-2 both include a laser chip 501 and a ceramic thermal sink 502, the laser chip 501 is eutectic welded on the ceramic thermal sink 502, and the upper surface of the ceramic thermal sink 502 has the positive electrode and the negative electrode of the laser chip 501. In this embodiment, the laser chip 501 is a DC high-power laser chip, the chip itself does not need to add high-frequency signals, but only for DC current, the laser chip 501 is eutectic welded on the ceramic thermal sink 502, and is located on the left side of the ceramic thermal sink 502, there are two electrode layers on the upper surface of the ceramic thermal sink 502, which are the positive and negative electrodes of the laser chip 501. The light-emitting direction of the laser chip 501 is toward the left, that is, toward the silicon photonics chip. The light-emitting direction of the laser chip 501, the coupling lens group 205 and the isolator 206 are all parallel to the short boundary of the silicon photonics chip, the light-emitting direction of the laser chip 501 is coaxial with the coupling lens group 205, so the light beam emitted by the laser chip 501 is still parallel to the short boundary of the silicon photonics integrated chip 203 after passing through the coupling lens group 205 and the isolator 206.

As an optimization scheme of the embodiment of the present invention, please refer to FIG. 1 to FIG. 6, the grinding angle of the end face of the FA assembly 210 is equal to the inclination angle θ of the receive-input waveguide unit in the silicon photonics integrated chip 203, and the main body of the FA assembly 210 is inclined towards the central axis of the entire optical component, the side of the FA assembly 210 away from the silicon photonics integrated chip 203 is connected with an MPO/MT optical interface 202 through an optical fiber cable 211. In this embodiment, the end of the optical fiber cable 211 is connected to the MPO/MT optical interface 202, and the MPO/MT optical interface 202 is the optical interface that meets international standards, so the transmit-output optical interface and the receive-input optical interface of the entire parallel optical component are integrated together inside the MPO/MT optical interface.

Example 3

Please refer to FIG. 1 to FIG. 7, the embodiment of the present invention provides a coupling method of the silicon photonics multi-channel parallel optical component, including: S1 complete the assembly of the silicon photonics integrated chip 203, the laser group 204, the coupling lens group 205, the isolator 206 and the prism group 207 on PCBA board; S2, turn on the laser group 204 to maximize the response current of the monitoring detector unit, and solidify the coupling lens group 205; S3, turn on the response current monitoring of the receiving detector unit, and connect the FA assembly 210 with external jumper 701; S4, the jumper 701 is connected to an external optical device, the FA assembly 210 is fixed, and the coupling is completed. In this embodiment, the external optical device includes the light source, the optical power meter, etc. Specifically, there are two coupling methods for the entire optical component, the first is: first complete the assembly of the silicon photonics integrated chip 203, the assembly of the PCBA board 201, the assembly of the laser group 204, the assembly of the isolator 206, and the assembly of the prism group 207, then turn on the laser group 204 to maximize the response current of the monitoring detector unit, and solidify the coupling lens group 205, then keep the MZ modulator without bias voltage, and turn on the response current monitoring of the receiving detector unit at the same time, connect the MPO of the FA assembly 210 to the external 1×8 MPO-FC jumper 701. the four transmitting fibers corresponding to the MPO-FC jumper are connected to the four channel optical power meter 702, the four receiving fibers corresponding to the MPO-FC jumper are connected to the four channel light source 703, and the FA assembly 210 is coupled to maximize the four channel optical power of the four channel optical power meter 702 and the response current of the four channel receiving detector 107. The FA assembly 210 is fixed. Second, first complete the assembly of the silicon photonics integrated chip 203, the assembly of the PCBA board 201, the assembly of the laser group 204, the assembly of the isolator 206, and the assembly of the prism group 207, then turn on the laser group 204 to maximize the response current of the monitoring detector unit, and solidify the coupling lens group 205, then keep the MZ modulator without bias voltage, and turn on the response current monitoring of the receiving detector unit at the same time, connect the MPO of the FA assembly 210 to the external 1×8 MPO-FC jumper 701, the four fibers of the MPO-FC jumper corresponding to the first auxiliary waveguide 113-1, the second auxiliary waveguide 113-2, the third auxiliary waveguide 113-3 and the fourth auxiliary waveguide 113-4 are sequentially connected to the light source 704, the optical power meter 705, the light source 706, and the optical power meter 707, the FA assembly 210 is coupled to maximize the optical power of the optical power meters 705 and 707, and the FA assembly 210 is fixed. Especially for the second coupling method, due to the coupling method of the auxiliary waveguide 113, it is only necessary to connect a 1×8 MPO-FC jumper to the optical part of the optical component to realize the coupling, and maintaining the simple ribbon structure of the optical fiber cable 211 of the FA assembly 210, which is conducive to the spatial distribution of optical modules.

Although embodiments of the invention have been shown and described, it can be understood for those skilled in the art that various changes, modifications, substitutions and modifications can be made to these embodiments without departing from the principles and spirit of the invention, the scope of the present invention is defined by the appended claims and their equivalents.

What is claimed is:

1. A silicon photonics multi-channel parallel optical component, comprising: a laser group, a FA assembly and a silicon photonics integrated chip, the silicon photonics integrated chip comprises a transmit-input waveguide unit, a splitter unit, a modulator unit, a transmit-output waveguide unit, a receive-input waveguide unit, and a receiving detector unit integrated inside the chip; the transmit-input waveguide unit is used for receiving the optical signal input from an outside at a transmitting part the splitter unit is used for splitting a light; the modulator unit is used for modulating the optical signal; the transmit-output waveguide unit is used for outputting the optical signal modulated by the modulator unit to the outside world; the receive-input waveguide unit is used for receiving the optical signal input by an external link at a receiving part; the receiving detector unit is used for converting the optical signal into a photocurrent, both the transmit-output waveguide unit and the receive-input waveguide are connected to the FA assembly, and the transmit-input waveguide unit is arranged in the same path as the laser group, along a direction from the laser group to the silicon photonics integrated chip, a coupling lens group, an isolator, a prism group and a transmitting end glass strip are arranged in sequence between the laser group and the silicon photonics integrated chip; each waveguide in the transmit-input waveguide unit, each waveguide in the transmit-output waveguide unit and each waveguide in the receive-input waveguide unit are all located at the same boundary of the chip.

2. The silicon photonics multi-channel parallel optical component according to claim 1, wherein along a direction from the FA assembly to the silicon photonics integrated chip, a receiving end glass strip is further provided between the FA assembly and the silicon photonics integrated chip.

3. The silicon photonics multi-channel parallel optical component according to claim 2, further comprising a PCBA board, the PCBA board is provided with a window penetrating upper and lower surfaces of the PCBA board, the silicon photonics integrated chip, the laser group, the coupling lens group, the isolator the prism group, the transmitting end glass strip, the receiving end glass strip and the FA assembly are all placed in the window.

4. The silicon photonics multi-channel parallel optical component according to claim 3, wherein the window is provided with a thermal sink, and the silicon photonics integrated chip, the laser group, the coupling lens group, the isolator, the prism group, the transmitting end glass strip, the receiving end glass strip and the FA assembly are all arranged on the thermal sink.

5. The silicon photonics multi-channel parallel optical component according to claim 4, wherein the thermal sink is in a step shape, the silicon photonics integrated chip is arranged on a higher platform of the step shape, and the laser group, the coupling lens group, the isolator are arranged on a lower platform.

6. The silicon photonics multi-channel parallel optical component according to claim 4, wherein the lower surface of the PCBA board is provided with a support plate for plugging the window, and the thermal sink is placed on the support plate.

7. The silicon photonics multi-channel parallel optical component according to claim 1, further comprising a transmitting end driver chip and a receiving end TIA chip, both the transmitting end driver chip and the receiving end TIA chip are located on a side of the silicon photonics integrated chip away from the laser group and the FA assembly, the transmitting end driver chip is located in the direction from the laser group to the silicon photonics integrated chip, and the receiving end TIA chip is located in a direction from the FA assembly to the silicon photonics integrated chip.

8. The silicon photonics multi-channel parallel optical component according to claim 1, wherein the laser group comprises a first laser and a second laser, the first laser and the second laser both comprise a laser chip and a ceramic thermal sink, the laser chip is eutectic welded on the ceramic thermal sink, and an upper surface of the ceramic thermal sink has a positive electrode and a negative electrode of the laser chip.

9. The silicon photonics multi-channel parallel optical component according to claim 1, wherein a grinding angle of an end face of the FA assembly is equal to an inclination angle $\theta$ of the receive-input waveguide unit in the silicon photonics integrated chip, and a main body of the FA assembly is inclined towards a central axis of the entire optical component, a side of the FA assembly away from the silicon photonics integrated chip is connected with an MPO/MT optical interface through an optical fiber cable.

10. A coupling method of the silicon photonics multi-channel parallel optical component, comprising:
   S1, completing an assembly of a silicon photonics integrated chip, a laser group, a coupling lens group, a isolator and a prism group on a PCBA board;
   S2, turning on the laser group to maximize a response current of a monitoring detector unit, and solidifying the coupling lens group;
   S3, turning on a response current monitoring of a receiving detector unit, and connecting a FA assembly with an external jumper;
   S4, connecting the jumper to an external optical device, fixing the FA assembly, and a coupling is completed;
   wherein, the silicon photonics integrated chip comprises a transmit-input waveguide unit a splitter unit, a modulator unit, a transmit-output waveguide unit, a receive-input waveguide unit, and a receiving detector unit integrated inside the chip, the transmit-input waveguide unit is used for receiving the optical signal input from an outside at a transmitting part; the splitter unit is used for splitting a light; the modulator unit is used for modulating the optical signal; the transmit-output waveguide unit is used for outputting the optical signal modulated by the modulator unit to the outside world; the receive-input waveguide unit is used for receiving the optical signal input by an external link at a receiving part; the receiving detector unit is used for converting the optical signal into a photocurrent, both the transmit-output waveguide unit and the receive-input waveguide are connected to the FA assembly; each waveguide in the transmit-input waveguide unit, each waveguide in the transmit-output waveguide unit and each waveguide in the receive-input waveguide unit are all located at the same boundary of the chip.

\* \* \* \* \*